July 31, 1923.

R. C. TURNER ET AL 1,463,732

DEVICE FOR RIVETING HALF SOLES ON PNEUMATIC RUBBER TIRES

Filed May 13, 1922

Ralph C. Turner and
Edward T. Alston, INVENTORS.

BY David E. Lain,
ATTORNEY.

Patented July 31, 1923.

1,463,732

UNITED STATES PATENT OFFICE.

RALPH C. TURNER AND EDWARD T. ALSTON, OF SEATTLE, WASHINGTON; SAID TURNER ASSIGNOR TO SAID ALSTON.

DEVICE FOR RIVETING HALF SOLES ON PNEUMATIC RUBBER TIRES.

Application filed May 13, 1922. Serial No. 560,345.

*To all whom it may concern:*

Be it known that we, RALPH C. TURNER and EDWARD T. ALSTON, citizens of the United States, and residents of Seattle, in the county of King and State of Washington, have invented a new and useful Device for Riveting Half Soles on Pneumatic Rubber Tires, of which the following is a specification.

Our invention relates to improvements in machines for riveting half soles on pneumatic rubber tires, and one of the objects of our improvements is to provide a machine which will retain the tires in convenient place while the holes for the rivets are being punched. Another object of our improvements is to provide an anvil or last having one area suited for upsetting rivets thereon and another area adapted for punching holes through the tire walls thereon. Another object of our improvements is to provide an adjustable holder for the tires while being riveted. And a further object of our improvements is to provide a clamp for pressing on the washer while the rivet is being upset.

Figure 1:
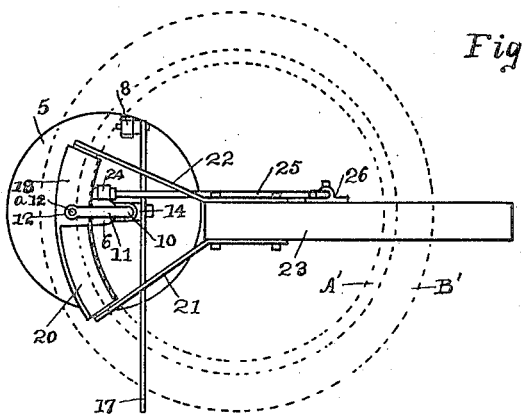
Figure 4:
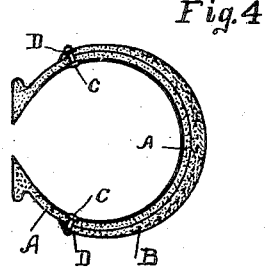
Figure 2:
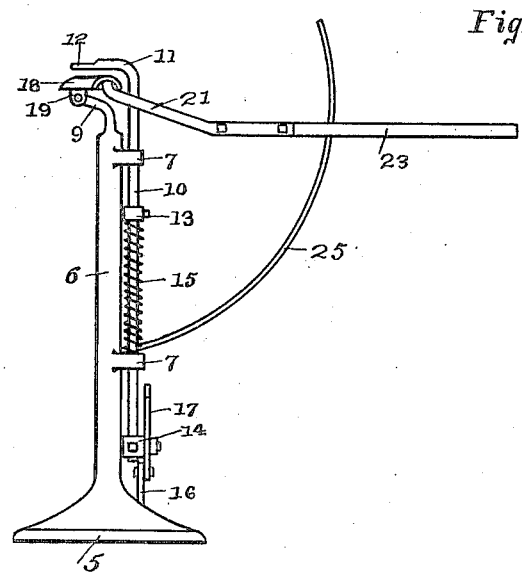
Figure 3:
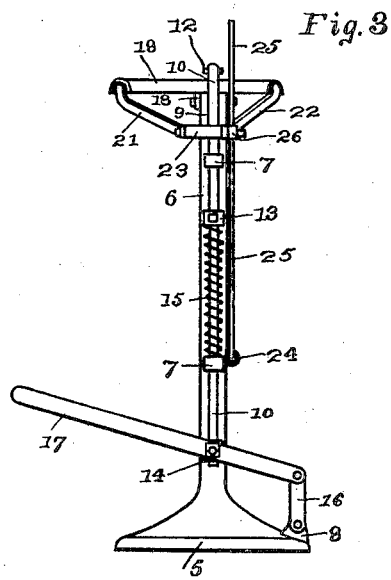

We attain these objects with the mechanism illustrated in the accompanying sheet of drawings, forming a part of this specification, in which Figure 1 is a plan view of our riveting machine, Fig. 2 is a side elevation of Fig. 1, Fig. 3 is a rear elevation of Fig. 2, and Fig. 4 is a sectional view of a tire half soled by our machine, drawn on a larger scale.

Similar characters refer to similar parts throughout.

More particularly: The stand of the machine consists of base 5 and post 6. On the rear of said post are two lugs 7, 7 having holes in line. On the right-hand side of base 5 as shown in Fig. 3 is lug 8 having a hole therein. From the top of post 6 extends upward and forward bracket 9 having a horizontal hole therein. Clamping rod 10 is mounted for reciprocation in the holes in lugs 7. Said rod is bent over forward at 11 and has a flattened end 12 through which is vertical hole $a^{12}$ smaller than the rivet washers used. On rod 10 between lugs 7 is mounted set ring 13. On the lower end of rod 10 is mounted set ring 14 having a horizontal gudgeon thereon extending rearward. On rod 10 is mounted spiral spring 15 to react between lower lug 7 and set ring 13. Link 16 is pivoted in lug 8. Foot lever 17 is fulcrumed on the gudgeon on set ring 14 and pivoted to link 16. Metal last or anvil 18 is mounted on a horizontal axis or hinge joint by means of lugs 19 which extend from the bottom thereof and are pivoted to bracket 9. An inset of lead or babbitt 20 is molded in a cavity in the upper surface of anvil 18 in the right-hand end of said anvil as one faces the machine in Fig. 1. An arm 23 is provided with spreading shank bars 21, 22 which are fastened to anvil 18. On the left hand side of post 6 is lug 24 which has a hole in which is mounted and fixed curved bracket rod 25, which is also adjustably mounted in lug 26, fastened to the left-hand side of arm 23, and retained in position by a set screw in said lug 26.

In Fig. 4 a pneumatic rubber tire is shown in cross section at A from which the tread has been stripped. From another tire of same size the rims have been removed and the half sole B, thus prepared, is mounted over tire A as shown. Then rivets C with washers D are used to fasten the half sole on the inner tire along the edges of said sole, as shown. It is the proper fastening of the sole on the tire that hitherto has been found so difficult and which our machine makes easy. To do this we proceed as follows: Tire A is chosen because its rims are good, while its walls may be ruptured. Tire B is chosen because its walls are sound while its rims may be cut. It is understood that used tires are made to serve our purpose. Said tires are placed together as shown in Fig. 4 and placed on the machine as shown in dotted outline at A', B', Fig. 1, with anvil 18 inserted in tire A, bracket 9 and shank bars 21 and 22 easily being accommodated between the rims of the tire. A punch which removes a piece of rubber and fabric from the walls of A and B large enough to permit the insertion of rivets C from within is used to make several rivet holes through said walls as they lie over lead insert 20. Then rivets are placed in said holes with their heads within tire A. On each of said rivets is placed a washer D and, one at a time, they are placed beneath hole $a^{12}$ and bar end 12 is forced down on said washer by pressure obtained by forcing down lever 17 with a foot. This pressure should be sufficient to imbed the rivet head in the wall of tire A and the rivet washer in the wall of sole B. With a foot on lever 17 to maintain said pressure the end of the rivet is upset by a blow on a punch inserted in hole $a^{12}$. Then the foot is removed from said lever and spring 15 forces clamp 11 upward and the tire is moved toward the left and the riveting completed while the rivet head rests on the hard part of anvil 18. In this way the riveting proceeds till all of the needed rivets are placed in one side of the tire when it is removed, turned over, and again placed on anvil 18 and arm 23 and the rivets placed in its other side as described. By elevating and depressing arm 23 anvil 18 is caused to turn beneath hole $a^{12}$. Thus the adjustment of said arm is made to most easily bring the part of the tire in which rivets are to be placed beneath said hole.

Having thus disclosed our invention, what we claim is new and desire to secure by Letters Patent is,—

1. An anvil of a rubber tire-shoe riveting machine having a hard-metal surface area adapted to support a rivet when being upset and also having a soft-metal surface area adapted to receive the sharp end of a rivet-hole punch.

2. In a rubber tire-shoe riveting machine in combination, an anvil adapted to occupy the interior of a pneumatic rubber tire shoe and support a rivet through the walls of said shoe, a downpressor adapted to bear on the washer of said rivet when on said shoe and further adapted to expose the end of said rivet, and controllable means adapted to exert pressure on said downpressor whereby said washer is forced against said shoe.

3. In a rubber tire-shoe riveting machine in combination, an anvil adapted to occupy the interior of a pneumatic rubber tire shoe and support a rivet through the walls of said shoe also adapted to receive the sharp end of a rivet-hole punch, a downpressor adapted to bear on a washer around said rivet and on said shoe and further adapted to expose the end of said rivet, and controllable pressure means whereby said depressor can force said washer against said shoe.

4. In a rubber tire-shoe riveting machine in combination, a riveting-machine frame, an anvil adapted to occupy the interior of a pneumatic rubber tire shoe also adapted to support a rivet through the walls of said shoe and hingedly connected to said frame, an arm adapted to support said shoe and rigidly connected to said anvil, means adapted to retain said arm in a desired position in rotation on said hinge, a downpressor adapted to bear on a rivet washer around said rivet and on said shoe also adapted to expose the end of said rivet, and controllable pressure means whereby said depressor can force said washer against said shoe.

5. In a rubber tire-shoe riveting machine in combination, a machine frame, an anvil adapted to occupy the interior of a pneumatic rubber tire shoe having a hard-metal surface area adapted to support a rivet through a tire shoe when being upset also having a soft-metal surface area adapted to receive the sharp end of a rivet-hole punch and hingedly connected to said frame, an arm rigidly fastened to said anvil adapted to support a tire shoe and releasably attachable to a curved rod concentric with said hinge and fastened to said frame, a downpressor reciprocal in bearings on said frame adapted to bear on a washer around said rivet while exposing the end of said rivet, a fulcrumed foot lever pivoted to said downpressor adapted to depress the same to bear on said washer, and a spring adapted to react between said frame and said downpressor whereby said downpressor may be removed from said washer.

RALPH C. TURNER.
EDWARD T. ALSTON.